(12) United States Patent
Caron L'Ecuyer et al.

(10) Patent No.: US 11,685,052 B2
(45) Date of Patent: Jun. 27, 2023

(54) VISION GUIDED ROBOT ARM AND METHOD FOR OPERATING THE SAME

(71) Applicant: Kinova Inc., Boisbriand (CA)

(72) Inventors: Louis-Joseph Caron L'Ecuyer, Boisbriand (CA); Jean-Francois Forget, Boisbriand (CA); Jonathan Lussier, Boisbriand (CA); Sébastien Boisvert, Boisbriand (CA)

(73) Assignee: Kinova Inc., Boisbriand (CA)

( * ) Notice: Subject to any disclaimer, the term of this patent is extended or adjusted under 35 U.S.C. 154(b) by 746 days.

(21) Appl. No.: 16/574,673

(22) Filed: Sep. 18, 2019

(65) Prior Publication Data

US 2020/0086493 A1 Mar. 19, 2020

Related U.S. Application Data

(60) Provisional application No. 62/732,708, filed on Sep. 18, 2018.

(51) Int. Cl.
| | |
|---|---|
| *B25J 9/16* | (2006.01) |
| *H04N 13/207* | (2018.01) |
| *G06V 20/20* | (2022.01) |
| *H04N 23/45* | (2023.01) |
| *H04N 23/54* | (2023.01) |

(52) U.S. Cl.
CPC ........... *B25J 9/1697* (2013.01); *B25J 9/1664* (2013.01); *G06V 20/20* (2022.01); *H04N 13/207* (2018.05); *H04N 23/45* (2023.01); *H04N 23/54* (2023.01); *G06V 2201/06* (2022.01)

(58) Field of Classification Search
CPC ....... B25J 9/1697; B25J 9/1664; G06V 20/20; G06V 2201/06; G06V 20/10; H04N 5/2253; H04N 5/2258; H04N 13/207; H04N 13/239; H04N 13/254; H04N 13/271; G05B 2219/40425
See application file for complete search history.

(56) References Cited

U.S. PATENT DOCUMENTS

| | | | |
|---|---|---|---|
| 5,579,444 A * | 11/1996 | Dalziel | B25J 9/1697 |
| | | | 382/153 |
| 10,919,152 B1 * | 2/2021 | Kalouche | B25J 9/1697 |
| 2013/0346348 A1 * | 12/2013 | Buehler | B25J 9/1671 |
| | | | 901/31 |

(Continued)

*Primary Examiner* — Jeff A Burke
*Assistant Examiner* — Sihar A Karwan
(74) *Attorney, Agent, or Firm* — Fasken Martineau Dumoulin LLP; Serge LaPointe (57) ABSTRACT

A method for operating a vision guided robot arm system comprising a robot arm provided with an end effector at a distal end thereof, a display, an image sensor and a controller, the method comprising: receiving from the sensor image an initial image of an area comprising at least one object and displaying the initial image on the display; determining an object of interest amongst the at least one object and identifying the object of interest within the initial image; determining a potential action related to the object of interest and providing a user with an identification of the potential action; receiving a confirmation of the object of interest and the potential action from the user; and automatically moving the robot arm so as to position the end effector of the robot arm at a predefined position relative to the object of interest.

30 Claims, 7 Drawing Sheets

(56) References Cited

U.S. PATENT DOCUMENTS

2016/0055677 A1* 2/2016 Kuffner .................. G06T 11/00
                     901/1
2020/0130190 A1* 4/2020 Thackston ............. B25J 9/1689

* cited by examiner

VISION GUIDED ROBOT ARM AND METHOD FOR OPERATING THE SAME

CROSS REFERENCE TO RELATED APPLICATIONS

This application claims the benefit of U.S. Provisional Application No. 62/732,708 filed Sep. 18, 2018, the contents of which are hereby incorporated by reference in their entirety.

TECHNICAL FIELD

The present invention relates to the field of robotics, and more particularly to vision guided robotic arms and methods for operating vision guided robotic arms.

BACKGROUND

Assistive robotic or robot arms have been introduced in the recent years inter alia to help handicapped persons having upper body limitations in accomplishing everyday tasks such as opening a door, drinking water, handling the television's remote controller or simply pushing elevator buttons.

Such robotic arms are now available but are usually fully teleoperated by the user. While such usual robotic arms provide a great step forward, their teleoperation may be challenging especially for users having motricity limitation.

Some robotic arms are provided with a vision system installed on the robotic arm to help the user teleoperating the robotic arm such as to help the user grasping objects. However, for such usual vision guided robotic arms, the clamp's final movement to grasp an object to be grasped is usually performed blindly. When he is a handicapped person having mobility or motricity limitations, the user might not have the physical ability to always see what is happening when the robotic arm tries to grasp an object or when the object is being handled by the robotic arm for example.

Therefore, there is a need for improved vision guided robotic arm and method for operating vision guided robotic arms

SUMMARY

According to a first broad aspect, there is provided a method for operating a vision guided robot arm system comprising a robot arm provided with an end effector at a distal end thereof, a display, an image sensor and a controller, the method comprising: receiving from the sensor image an initial image of an area comprising at least one object and displaying the initial image on the display; determining an object of interest amongst the at least one object and identifying the object of interest within the initial image; determining a potential action related to the object of interest and providing a user with an identification of the potential action; receiving a confirmation of the object of interest and the potential action from the user; and automatically moving the robot arm so as to position the end effector of the robot arm at a predefined position relative to the object of interest.

In one embodiment, said determining an object of interest comprises determining at least two objects of interest and said identifying the object of interest within the initial image comprises identifying each one of the at least two objects of interest within the image.

In one embodiment, said determining a potential action comprises determining a respective potential action for each one of the at least two objects of interest.

In one embodiment, said receiving a confirmation of the object of interest and the potential action from the user comprises receiving an identification of a given one of the at least two objects of interest and a confirmation of the respective potential action associated with the given one of the at least two objects of interest.

In one embodiment, the method further comprises executing the potential action.

In one embodiment, the method further comprises allowing the user to perform the potential action.

In one embodiment, the predefined position is defined as a predefined distance from the object of interest.

In one embodiment, said determining the object of interest comprises: determining a surrounding of the user using the image; retrieving given objects associated with the determined surrounding of the user; and determining the object of interest amongst the given objects.

According to a second broad aspect, there is provided system for operating a vision guided robot arm system comprising a robot arm provided with an end effector at a distal end thereof, a display, an image sensor and a controller, the system comprising: a processing unit; a communication unit; a memory having stored thereon statements and instructions that, when executed by the processing unit perform the following steps: receiving from the sensor image an initial image of an area comprising at least one object and displaying the initial image on the display; determining an object of interest amongst the at least one object and identifying the object of interest within the initial image; determining a potential action related to the object of interest and providing a user with an identification of the potential action; receiving a confirmation of the object of interest and the potential action from the user; and automatically moving the robot arm so as to position the end effector of the robot arm at a predefined position relative to the object of interest.

In one embodiment, said determining an object of interest comprises determining at least two objects of interest and said identifying the object of interest within the initial image comprises identifying each one of the at least two objects of interest within the image.

In one embodiment, determining a potential action comprises determining a respective potential action for each one of the at least two objects of interest.

In one embodiment, receiving a confirmation of the object of interest and the potential action from the user comprises receiving an identification of a given one of the at least two objects of interest and a confirmation of the respective potential action associated with the given one of the at least two objects of interest.

In one embodiment, the system further comprises executing the potential action.

In one embodiment, the system further comprises allowing the user to perform the potential action.

In one embodiment, the predefined position is defined as a predefined distance from the object of interest.

In one embodiment, said determining the object of interest comprises: determining a surrounding of the user using the image; retrieving given objects associated with the determined surrounding of the user; and determining the object of interest amongst the given objects.

According to a third broad aspect, there is provided a vision guiding system for a robot arm provided with an end effector at a distal end thereof, the system comprising: a frame securable to the robot arm; an image sensor device enclosed within the frame; a user interface comprising at least a display; and a controller for: receiving from the image sensor an initial image of an area comprising at least one object; determining an object of interest amongst the at least one object and identifying the object of interest within the initial image; determining a potential action related to the object of interest and providing a user with an identification of the potential action; receiving a confirmation of the object of interest and the potential action from the user; and automatically moving the robot arm so as to position the end effector of the robot arm at a predefined position relative to the object of interest.

In one embodiment, the controller is configured for determining at least two objects of interest and said identifying the object of interest within the initial image comprises identifying each one of the at least two objects of interest within the image.

In one embodiment, the controller is configured for determining a respective potential action for each one of the at least two objects of interest.

In one embodiment, the controller is configured for receiving an identification of a given one of the at least two objects of interest and a confirmation of the respective potential action associated with the given one of the at least two objects of interest.

In one embodiment, the controller is further configured for executing the potential action.

In one embodiment, the controller is further configured for allowing the user to perform the potential action.

In one embodiment, the predefined position is defined as a predefined distance from the object of interest.

In one embodiment, the controller is configured for determining a surrounding of the user using the image; retrieving given objects associated with the determined surrounding of the user; and determining the object of interest amongst the given objects.

In one embodiment, the image sensor device comprising a first image sensor having a first field of view and a second image sensor having a second field of view, the first image sensor being positioned and oriented so that at least part of the end effector of the robot arm be in the first field of view of the first image sensor and the second image sensor being positioned and oriented so that the end effector be outside of the second field of view of the second image sensor; and In one embodiment, the first image sensor comprises a 2D image sensor.

In one embodiment, the second image sensor comprises a 3D image sensor.

According to another broad aspect, there is provided a vision guided robot arm system comprising: a robot arm provided with an end effector at a distal end thereof, an image sensor securable to the robot arm; a user interface comprising at least a display; and a controller for: receiving from the image sensor an initial image of an area comprising at least one object; determining an object of interest amongst the at least one object and identifying the object of interest within the initial image; determining a potential action related to the object of interest and providing a user with an identification of the potential action; receiving a confirmation of the object of interest and the potential action from the user; and automatically moving the robot arm so as to position the end effector of the robot arm at a predefined position relative to the object of interest.

In one embodiment, the controller is configured for determining at least two objects of interest and said identifying the object of interest within the initial image comprises identifying each one of the at least two objects of interest within the image.

In one embodiment, the controller is configured for determining a respective potential action for each one of the at least two objects of interest.

In one embodiment, the controller is configured for receiving an identification of a given one of the at least two objects of interest and a confirmation of the respective potential action associated with the given one of the at least two objects of interest.

In one embodiment, the controller is further configured for executing the potential action.

In one embodiment, the controller is further configured for allowing the user to perform the potential action.

In one embodiment, the predefined position is defined as a predefined distance from the object of interest.

In one embodiment, the controller is configured for: determining a surrounding of the user using the image; retrieving given objects associated with the determined surrounding of the user; and determining the object of interest amongst the given objects.

In one embodiment, the image sensor device comprising a first image sensor having a first field of view and a second image sensor having a second field of view, the first image sensor being positioned and oriented so that at least part of the end effector of the robot arm be in the first field of view of the first image sensor and the second image sensor being positioned and oriented so that the end effector be outside of the second field of view of the second image sensor; and In one embodiment, the first image sensor comprises a 2D image sensor.

In one embodiment, the second image sensor comprises a 3D image sensor.

According to a further broad aspect, there is provided a vision guiding system for a robot arm provided with an end effector at a distal end thereof, the system comprising: a frame securable to the robot arm; an image sensor device enclosed within the frame; the image sensor device comprising a first image sensor having a first field of view and a second image sensor having a second field of view, the first image sensor being positioned and oriented so that at least part of the end effector of the robot arm be in the first field of view of the first image sensor and the second image sensor being positioned and oriented so that the end effector be outside of the second field of view of the second image sensor; and a display for displaying thereon images taken by the first image sensor.

In one embodiment, the first image sensor comprises a 2D image sensor

In one embodiment, the second image sensor comprises a 3D image sensor.

According to still another broad aspect, there is provided a vision guided robot arm system comprising: a robot arm provided with an end effector at a distal end thereof; and a vision guiding system comprising: a frame securable to the robot arm; an image sensor device enclosed within the frame; the image sensor device comprising a first image sensor having a first field of view and a second image sensor having a second field of view, the first image sensor being positioned and oriented so that at least part of the end effector of the robot arm be in the first field of view of the first image sensor and the second image sensor being positioned and oriented so that the end effector be outside of the second field of view of the second image sensor; and a display for displaying thereon images taken by the first image sensor.

In one embodiment, the first image sensor comprises a 2D image sensor

In one embodiment, the second image sensor comprises a 3D image sensor.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
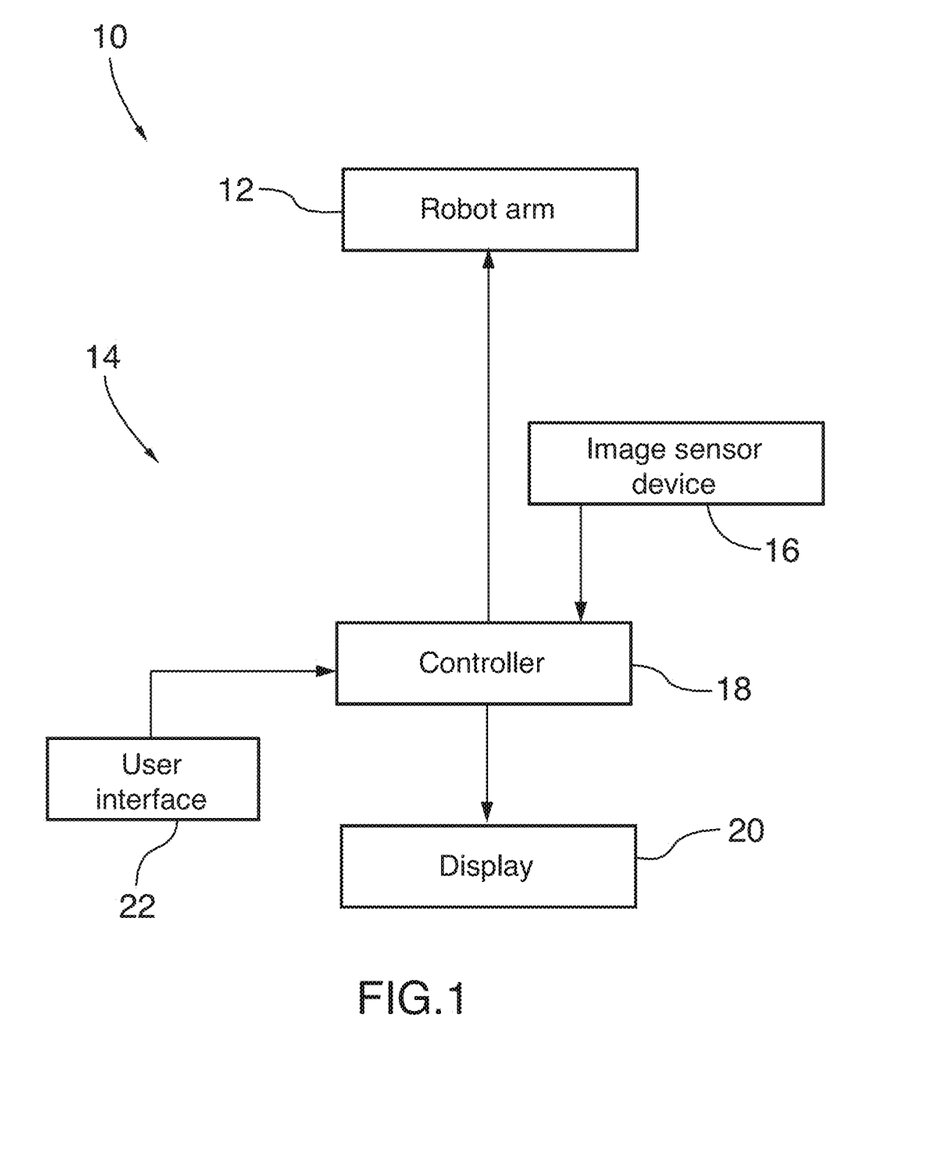
FIG. 1 is a block diagram illustrating a vision guided robot arm system, in accordance with an embodiment.

FIG. 1 illustrates a vision guided robot arm system 10 comprising a robot or robotic arm 12 and a vision guiding system 14 for controlling and operating the robot arm 12. The vision guiding system 14 comprises an image sensor device 16, a controller 18, a display 18 and a user interface 22.

The robot arm 12 is a motorized mechanical arm comprising at least two links or arm body parts connected together by joints allowing rotational motion and/or translational displacement of the arm body parts. The distal end of a robot arm 12 is usually terminated by an end effector such as a gripper or a tool, designed to interact with the environment.

In one embodiment, the vision guiding system 14 is independent from the robot arm 12.

In another embodiment, the vision guiding system 14 is removably or permanently secured to the robot arm 12.

In a further embodiment, the vision guiding system 14 is integral with the robot arm 12.

As described above, the vision guiding system 14 comprises an image sensor device 16. The image sensor device 16 comprises at least one image sensor for imaging an area comprising an object with which the robot arm 12 will interact.

In one embodiment, the image sensor is a 2D image sensor configured for generating 2D images or videos such as 2D images or videos of an area of interest comprising at least one object.

In another embodiment, the image sensor is a 3D image sensor configured for imaging the area of interest.

In one embodiment, the image sensor device 16 comprises more than one image sensor. For example, the image sensor device may comprise a 2D image sensor and a 3D image sensor, each pointing in different directions for example.

The controller 18 is configured for controlling the configuration of the robot arm, i.e. controlling the relative position and orientation of the different arm body parts in order to position the end effector of the robot arm 12 at a desired position and/or orient the end effector according to a desired orientation.

In one embodiment, the controller 18 is adapted to receive commands from the user interface 22 and control the robot arm 12 according to the received commands. The user interface 22 may be any adequate device allowing a user to input commands such as a mechanical interface, an audio interface, a visual interface, etc. For example, the user interface 22 may be a touch screen interface, a joystick pointer, a voice command interface, an eye movement interface, an electromyography interface, a brain-computer interface, or the like. For example, the commands inputted by the user may be indicative of an action to be performed or the motion to be followed by the end effector of the robot arm 12, such as move forward, move backward, move right, move left, etc. In this embodiment, the robot arm 12 is said to be operated in a teleoperation mode.

In another embodiment, the controller 18 is configured for automatically controlling the robot arm 12. For example, the controller 18 may be configured for determining the target position and/or orientation of the end effector and control the robot arm to bring the end effector into the desired position and/or orientation. In this automated mode, a user may input a desired action to be performed and the controller 18 is configured for controlling the robot arm 12 to achieve the inputted action.

As described in further detail below, the controller 18 is further configured for displaying images or videos of an area of interest taken by the image sensor device 16 on the display 20. The area of interest comprises at least one object including a target object with which the end effector of the robot arm 12 is to interact. The controller 18 is further configured for automatically determining a target object within the area of interest and highlighting or identifying the determined object within the image displayed on the display.

It should be understood that any adequate object detection/recognition method for determining the presence of objects within an image may be used. For example, methods such as edge detection methods, blob methods, depth map methods, color map methods or the like may be used.

In one embodiment, the "granulometry" or "size grading" method based on deep learning and/or deep neural network may be used. This approach consists first in understanding the surroundings and the context of the user and then detecting the most probable objects that can be found. Using this approach, the vision sensor device first takes at least one image of the close surroundings of the user and the controller can then determine where the user is, e.g. if the user is in a living room, a kitchen, a bedroom, etc. Then, still using the deep learning approach, the controller will analyze the image(s) and detect and identify the objects that are usually found in such surroundings. As an example, if it is determined that the user is in a living room, the system will look for a TV remote, a phone, books, etc. This approach avoids the system to perform unneeded calculations to try identifying objects that are not relevant with the surrounding or context like, as an example, an electric shaver in a living room.

It should be understood that any adequate method for highlighting/identifying an object within a displayed image may be used. For example, a cursor may be generated and point at the target object within the displayed image. In another embodiment, the target object may be encircled within the displayed image.

The controller 18 is further configured for determining a potential action to be executed, the potential action being related to the target object. For example, if the determined target object is a glass, the controller 18 may determine that the related action may be "grab the glass". The controller 18 is also configured for providing the user with the determined potential action. It should be understood that any adequate method for informing the user of the potential action may be used. For example, a graphical representation of the potential action may be displayed on the display 20. The graphical representation may be an icon, an image, text, a picture, a video, etc. In another example, the vision guided robot arm system 10 may be provided with a sound system comprising a speaker and a sound indicative of the action to be performed may be emitted. The controller 18 may comprise a voice generator to provide the user with the determined action to be performed via the speaker.

The user then inputs via the user interface 22 a confirmation for the identified target object and for the determined action to be performed. It should be understood that any adequate method may be used by the user to input the confirmation. For example, the user interface 22 and the display 20 may be integral in the form of a touch screen. In this case, the target object may be identified in the image displayed on the display 20 and the action to be performed may be provided to the user via a graphical representation displayed on the display 20. In this case, the user may confirm the target action by touching the object of the display 20 and confirm the action to be performed by touching the graphical representation of the action displayed on the display 20. In another example, the interface may comprise a microphone and the controller may be configured for performing voice recognition. In this case, the confirmation of the target object and the action to be performed may be vocal.

In an embodiment in which the "granulometry" or "size grading" method is used to detect objects, the controller may go through a decision tree process to determine the action that should be executed with the object, based on the context or surroundings previously identified. As an example, if the controller identifies a book on a table in a living room, the possible actions are either to take the book and store it on a shelf or to take the book and bring it to the user so he can read it. It should be understood that this decision tree will improved as new situations occur.

Upon receipt of the confirmation of the target object and the action to be performed, the controller 18 is configured to automatically move the robot arm 12 so as to position the end effector of the robot arm near the target object. It should be understood that the controller uses the data obtained from the image sensor device 16 to position the end effector near the target object, i.e. to position the end effector close enough from the target to touch it. In one embodiment, the end effector is positioned at about 10 cm from the target object or less.

It should be understood that any adequate method for determining the distance between the end effector and the object may be used.

For the automatic guidance of the robot arm and as the end effector approaches the target object of interest, the image sensor device may takes periodically new images in order to confirm that the end effector is moving towards the right direction, i.e. toward the target object. Also, if the object of interest has moved from its original position or if another object was inserted in front of the object of interest, the controller may identify those situations and recalculate a new trajectory.

In one embodiment, a low computational cost and fast deep neural network based object tracking approach may be used to identify the offset between the target object and the position and orientation of the camera to make corrections.

In one embodiment, the vision guiding system 14 is configured to operate the robot arm 12 in a fully automated mode. In this case, the user cannot control the robot arm 12 via the interface 22.

In another embodiment, the vision guiding system 14 is configured to operate the robot arm 12 in a dual mode, i.e. both a fully operated mode and a teleoperation mode are possible. In this case, the user may control the robot arm 12 via the interface.

In one embodiment, the controller 18 is further configured for automatically executing the action confirmed by the user after having moved the end effector near the target object. For example, if the confirmed action is "grab the glass", then the controller 18 may control the robot arm 12 so that then effector grabs the glass after having moved the end effector near the glass.

In another embodiment, the user takes control of the robot arm 12 after the controller 18 automatically moved the end effector near the target object. In this case, the user controls the robot arm 12 via the user interface 22 to complete the action. For example, once the end effector has been positioned near a glass to be grabbed, the user may use the user interface 22 to control the robot arm 12 so that the end effector grabs the glass.

In one embodiment, the image sensor device 16 is securable to the robot arm 12. For example, the image sensor device 16 may be securable adjacent to the end effector of the robot arm 12.

In one embodiment, the image sensor device 16 comprises a 2D image sensor and a 3D image sensor. In this case, the 2D image sensor is used for imaging the area containing the target object and the 2D images taken by the 2D image sensor are displayed on the display 20. The 3D image sensor collects data, such as the distance between the end effector and the target object, that are used by the controller 18 for automatically moving the robot arm, such as automatically positioning the end effector of the robot arm 12 near the target object. However, it should be understood that data from both the 2D image sensor and the 3D image sensor may be used for controlling the position of the end effector.

In an embodiment in which the image sensor device 16 comprises a 2D image sensor and a 3D image sensor, the 2D image sensor may be positioned so that the end effector or at least a part of the end effector be always located within the field of view of the 2D image sensor, and the 3D image sensor is positioned so that the end effector is never located within the field of view of the 3D image sensor. For example, if the end effector of the robot arm 12 is a gripper, the 2D image sensor may be positioned so that at least part of the fingers of the gripper are always located in the field of view of the 2D image sensor while always being outside of the field of view of the 3D image sensor.

It should be understood that any 2D image sensor configured for generating a 2D image of a scene such as an area comprising a target object may be used. In one embodiment, the 2D image sensor is a camera.

It should be understood that any adequate 3D image sensor may be used. In one embodiment, the 3D image sensor comprises two infrared (IR) cameras and an IR light projector. It should be understood that the 3D image sensor could use various technologies: stereovision, time-of-flight, laser beam, etc.

In one embodiment, the controller 18 comprises a processing unit, a communication unit for receiving/transmitting data, and a memory having stored thereon statements and instructions to be executed by the processor.

Figure 2:
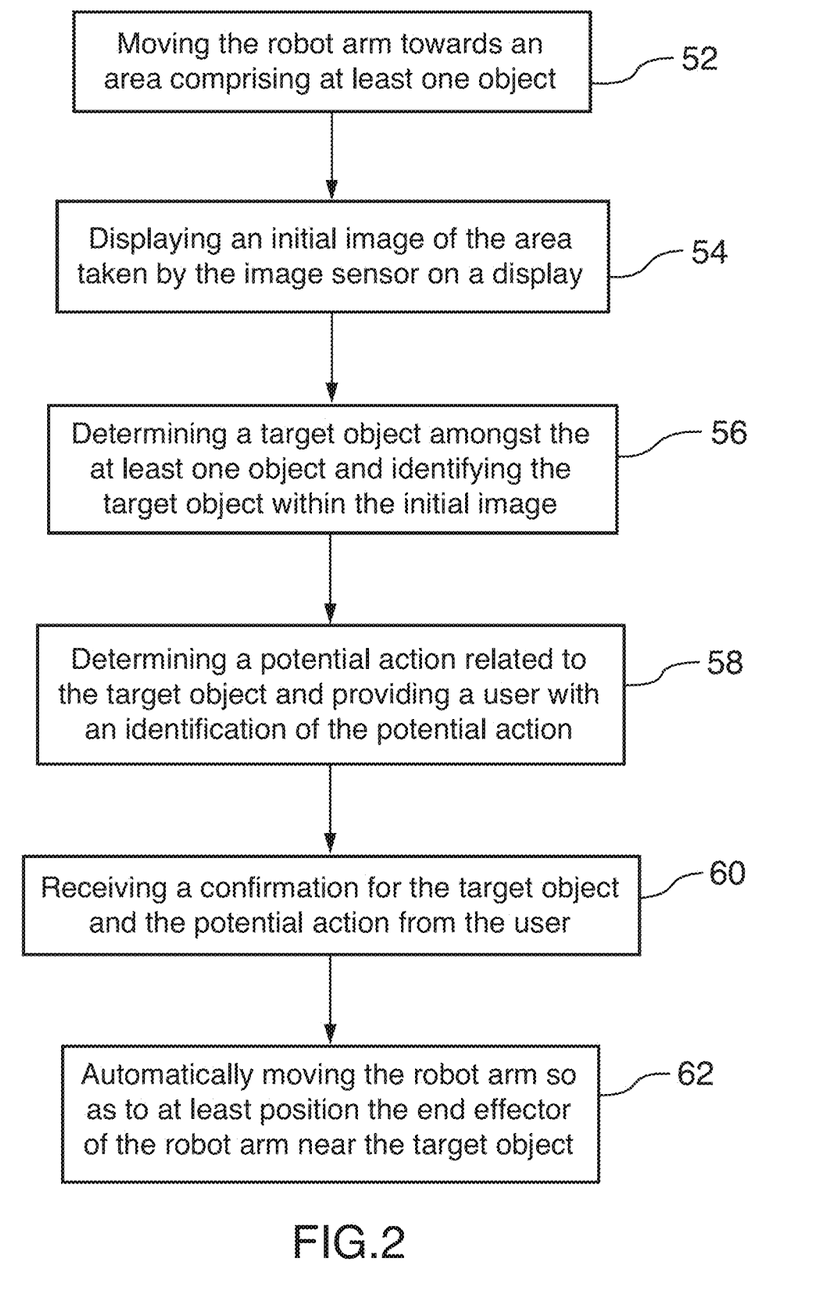
FIG. 2 is a flow chart of a method for operating a robot arm, in accordance with an embodiment.

FIG. 2 illustrates one embodiment of a method for controlling a robot arm such as robot arm 12.

At step 52, the robot arm 12 is positioned roughly towards an area of interest which comprises at least one object. An object may be a glass, a door handle, an electric shaver, an elevator button, etc.

In one embodiment, the robot arm 12 is positioned via teleoperation, i.e. the user controls the robot arm 12 to roughly position the end effector of the robot arm 12 relative to an area of interest. In this case, step 52 comprises receiving motion/orientation commands from the user interface 22 and controlling the robot arm 12 according to the received commands.

In another embodiment, the rough positioning of the robot arm 12 relative to the area of interest may be performed automatically by the vision guiding system 14 when the robot arm 12 is operated in the automated mode.

In one embodiment, step 52 may be omitted for example when the robot arm 12 is already roughly positioned relative to the area of interest.

At step 54, an image of the area of interest taken by the image sensor device 16 is displayed on the display 20. It should be understood that a stream of images or a video may be displayed at step 54.

At step 56, a target object for the robot arm 12 to interact with is determined from the image of the area of interest. In an embodiment in which the area of interest comprises a plurality of objects, all of the objects may be identified at step 56.

At step 56, the determined target object is identified within the displayed image. As described above, any adequate method for identifying/highlighting an object within an image may be used. If a plurality of objects have been determined, then each object is identified within the displayed image.

At step 58, a potential action to be executed and associated with the target object is determined and provided to the user. As described above, any adequate method for providing the user with the associated action may be used.

If more than one objects have been determined from the image, then a corresponding action may be determined for each object and provided to the user at step 58. For example, for an object being a glass, the associated action may be grabbing the glass. For an object being a door handle, the associated action may be turning the door handle. For an object being a button, the associated action may be pushing the button, etc.

At step 60, a confirmation or identification of the target object is received as well as a confirmation for the action associated with the target object.

In an embodiment in which a plurality of objects have been identified in the displayed image, the user selects one of the objects as being the target object and confirms that the associated action would be performed. In this case, the identification of the target object and the confirmation of its associated action are received at step 60.

As described above, any adequate method for confirming/identifying the target object and confirming the associated action may be used. For example, the confirmation/identification may be performed by touching a screen, saying a word or a sentence, etc.

Once the confirmations have been received, the robot arm 12 is automatically moved at step 62 so as to position the end effector of the robot arm 12 at a predefined position or distance from the target object. For example, the controller may automatically move the end effector of the robot arm 12 near or close to the target object such as within 10 cm from the target object. The automatic motion of the robot arm 12 includes determining the distance between the end effector of the robot arm 12 and the target object using the data collected by the image sensor device 16.

In one embodiment, the user can interrupt the process by pushing a button, moving a joystick, making a sound, or by any other means, if required.

In one embodiment, an image of the target object is taken by the image sensor device 16 after step 62 once the end effector has been positioned near the target object. Once the further image has been displayed, the user may be asked to confirm the target object. In this case, the action can only be performed once the further confirmation has been received from the user.

In one embodiment, before the action be automatically performed, the user may define/specify how the action should be performed. For example, when a glass is to be grasped by the end effector of the robot arm 12, the user may specify how the glass should be grasped, e.g. from the top, from the bottom, from the side, etc. In this case, different scenarios/methods for performing the action may be displayed on the display 20 and the user may select a desired scenario/method via the interface 22.

In one embodiment, once the end effector of the robot arm 12 has been positioned near the target object, the action may be performed automatically by the vision guiding system 14. For example, when the target object is a glass, the vision guiding system 14 controls the robot arm 12 for the end effector to grasp the glass.

In another embodiment, the once the end effector of the robot arm 12 has been positioned near the target object, the action may be performed manually by the user while using the user interface 22. For example, when the target object is a glass, the user uses the user interface 22 for controlling the robot arm 12 so as to grasp the glass with the end effector.

In one embodiment, once the end effector of the robot arm 12 has been positioned at a predefined distance from the target object at step 62, the user is requested to choose between an automatic mode in which the robot arm 12 will automatically perform the action and a manual mode in which the action may be performed manually by the user.

In one embodiment, as the robotic arm 12 pauses after reaching the position at step 62 and just before the final grasping, the user may decide if the action will be performed by teleoperation or by automatically by vision guidance. The selection of the operation mode for executing the action may be performed using a touch screen, a mouse, user's voice or any other adequate means depending of the physical limitations of the user.

In an embodiment in which the vision guiding system operates in an automated mode for controlling the robot arm 12, the determined and confirmed action may be followed by at least another action. For example, if the target object is a bottle and the associated action is grabbing the bottle with the gripper of the robot arm 12, the vision guiding system 14 may autonomously control the robot arm 12 to bring the bottle close to the user's lips so that the user may drink. In another example, the robot arm 12 is controlled so as to pull or push the door handle to open the door after the door handle was turned. In a further example, the robot arm 12 retracts to a compact position after a button of an elevator was pushed.

It should be understood that the order for the steps 52-62 may vary. For example, step 56 and/or 58 may be performed before the display of the image performed at step 54.

In one embodiment, the robot arm system 10 is installed on a mobile platform such as a wheelchair, an automated guided vehicle (AGV), a self-driving vehicle (SDV) or the like, the vision guiding system 14 may also be configured for controlling the mobile platform when the robot arm 12 operates in the autonomous mode. As an example, if the user instructs the robotic arm 12 to grasp an object and the object is too far away for the robot arm 12 to reach it, the vision guiding system 14 may control the mobile platform to move it forward automatically so the object can be within the robot arm's reach. Similarly, in another example, the robot arm has to pull a door to open it but the mobile platform could obstruct the opening of the door. In this case, the vision guiding system may make the mobile platform to move backward automatically to clear the opening movement of the door.

In one embodiment, the vision guided robot arm 10 can also be used specifically in a teleoperation mode, installed or not on a mobile platform. In this situation and in one embodiment, both 2D and 3D image sensors send a signal to a user interface to guide the user teleoperating properly the robot arm.

If the user in an handicapped person, the user's physical limitations might prevent him of turning his head in order to always have in sight the end effector of the robot arm 12 to perform a desired task. Having a continuous video signal captured by the image sensor device 16 enables the user to adequately teleoperate the robot arm 12 to achieve various tasks.

The present vision guiding system 14 may find applications in rescue missions, bomb disposal, large asset inspection where the vision guided robotic arm 10 is installed on a AGV or SDV. Again, having a continuous video signal from the image sensor device 16 enables the operator to better teleoperate the robot arm 12 and the AGV or SDV to achieve various tasks.

In one embodiment, it may be possible to select the coordinate system to teleoperate the robot arm 12, as described in greater detail below. For example, the base reference axes of the robot arm 12 may be used for the various movements (up, down, left, right, etc.). Alternatively, the vision system reference axis may be used for similar movements. In one embodiment, using the vision system reference axis for teleoperating the robot arm may provide more intuitive movements for the remote user as both previously mentioned reference axis are not positioned and oriented the same.

While the above-described vision guiding system 14 and method 50 can be used for controlling/operating any robot arm provided with an end effector, FIGS. 3 to 9 illustrate an exemplary robot arm 100 provided with a vision guiding system 102 and a gripper 104 as end effector.

Figure 9:
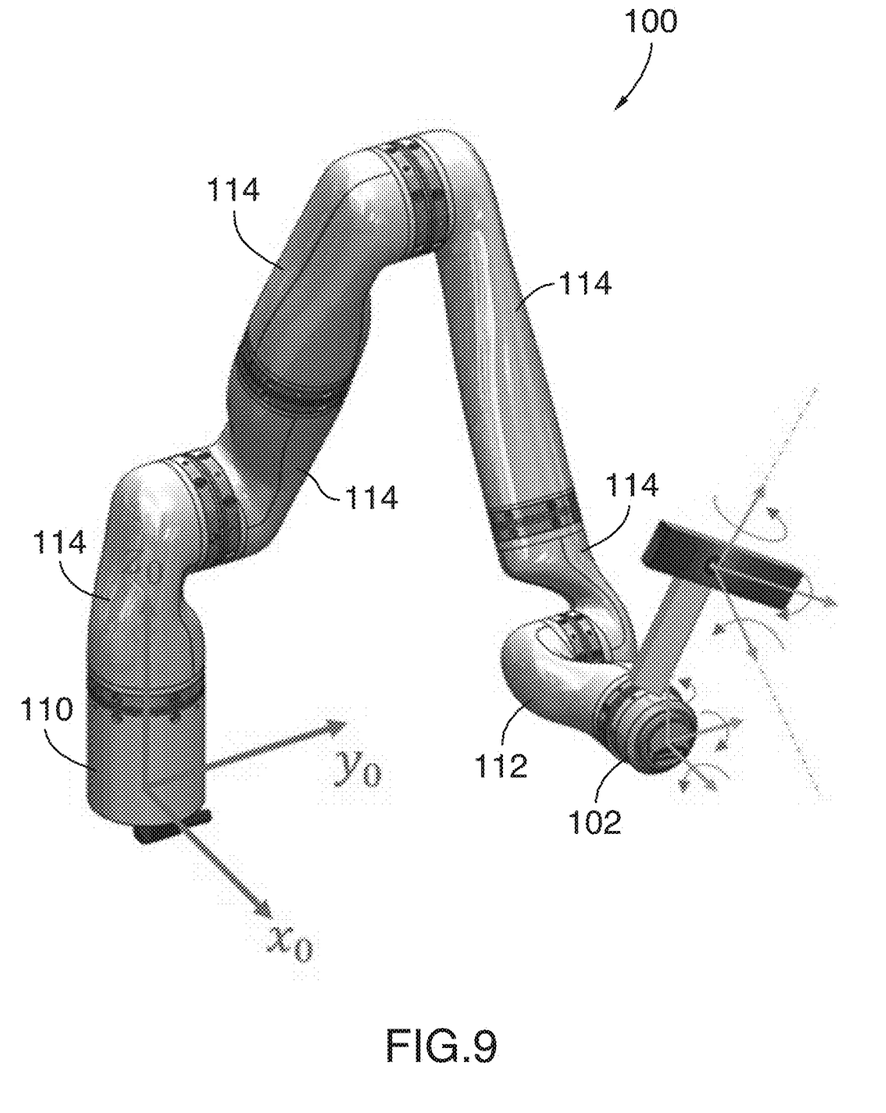
FIG. 9 is an isometric view of a robot arm having the vision guising system of FIG. 3 secured thereto, in accordance with an embodiment.

As illustrated in FIG. 9, the robot arm 100 comprises a plurality of arm segments 110, 112 and 114 rotatably connected together. The arm segments comprise a proximal segment 110 which may be securable to a mobile platform, a distal arm segment 112 and five arm segments 114 connected between the proximal arm segment 110 and the distal arm segment 112. It should be understood that the number of segments 114 is exemplary only.

The vision guiding system 102 is connected at the distal end of the distal arm segment 112 and the gripper 104 (not shown in FIG. 9) is connected to the vision guiding system 102 so that the vision guiding system 102 is positioned between the distal arm segment 112 and the gripper 104.

Figure 3:
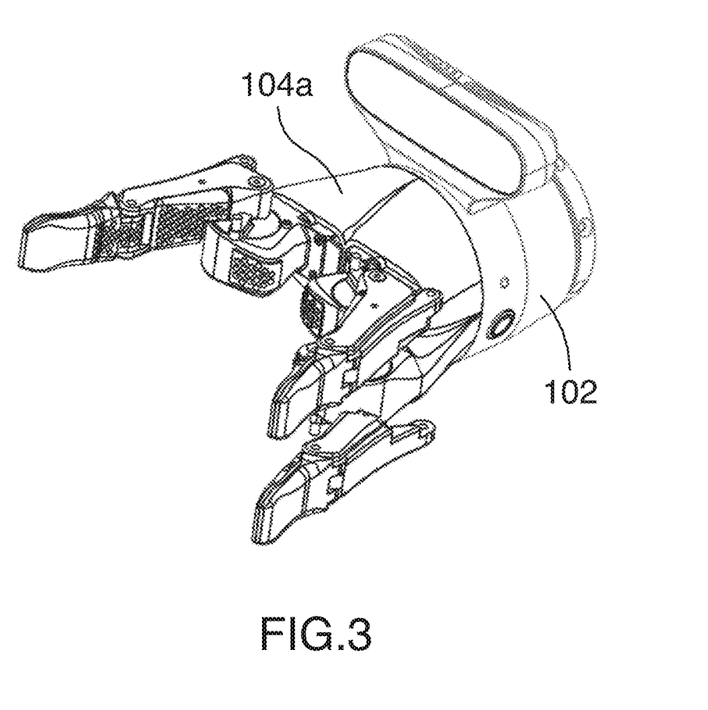
FIG. 3 is an isometric view of a vision guiding system installed on a first gripper of a robot arm, in accordance with an embodiment.
Figure 4:
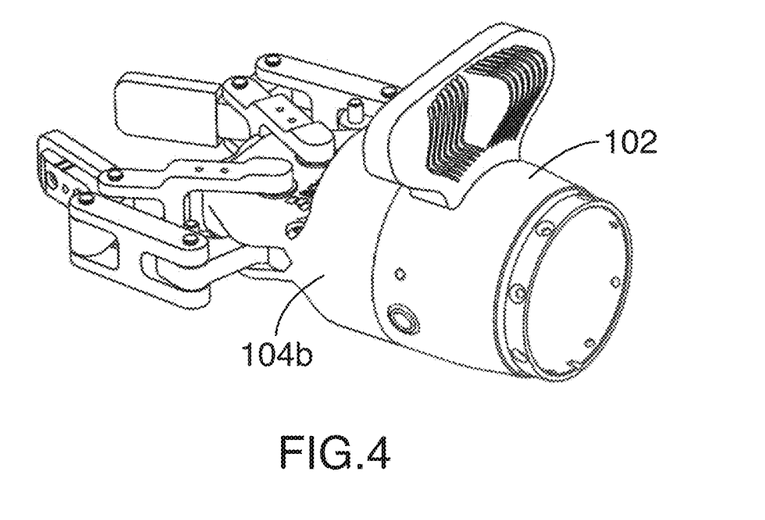
FIG. 4 is an isometric view of a vision guiding system installed on a second gripper of a robot arm, in accordance with an embodiment.

FIG. 3 illustrates the vision guiding system 102 connected to a gripper 104a comprising three fingers while FIG. 4 illustrates the vision guiding system connected to a gripper 104b provided with two fingers.

In one embodiment, the vision guiding system 102 is rotatably secured to the arm segment 112 and/or to the gripper 104. The vision guiding system 102 may be motorized for rotating the vision guiding system 102 relative to the arm segment 112 and/or the gripper 104.

Figure 5A:
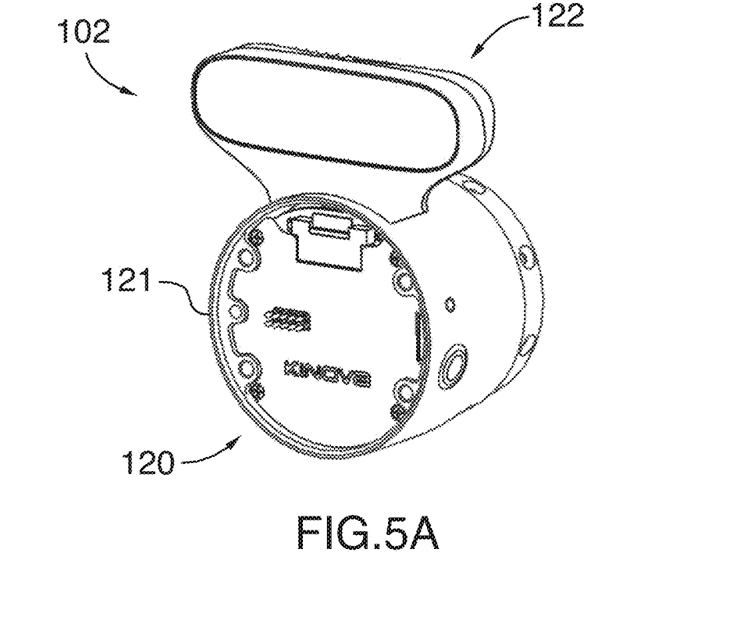
FIG. 5A is a front isometric view of the vision guiding system of FIG. 3, in accordance with an embodiment.
Figure 5B:
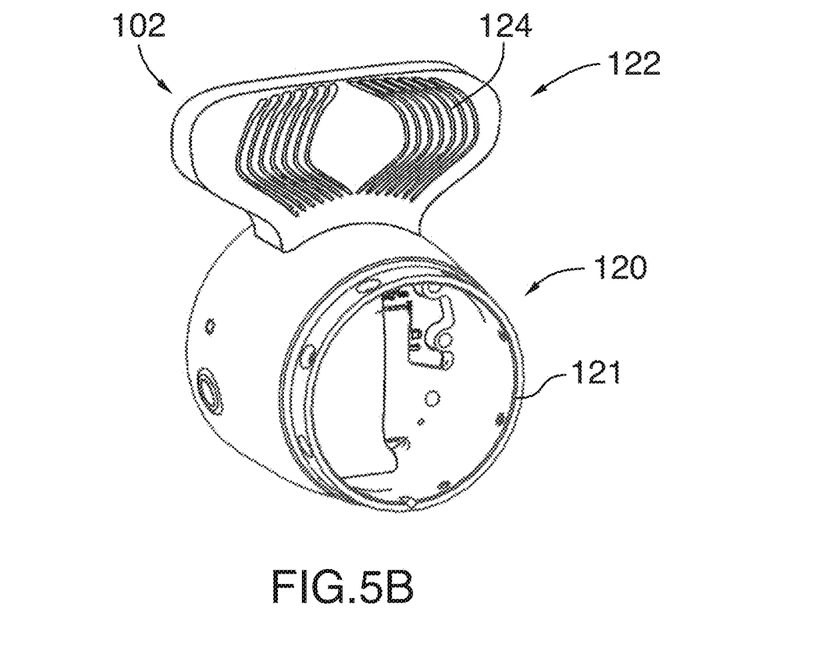
FIG. 5B is a back isometric view of the vision guiding system of FIG. 3, in accordance with an embodiment.

As illustrated in FIGS. 5A and 5B, the vision guiding 102 system comprises a central portion 120 and a top portion 122. The central portion 120 comprises a tubular body 121 having a first end securable to the gripper 104 and a second end securable to the distal arm segment 112. The top portion 120 extends radially from the central portion 120. As illustrated in FIG. 5B, the back side of the top portion 122 is provided with cooling fins 124 which act as a heat sink for evacuating heat generated by electronic components located within the top portion 122.

In one embodiment, the tubular body 121 may be rotatably securable to the gripper 104 and the distal arm segment 112.

Figure 6:
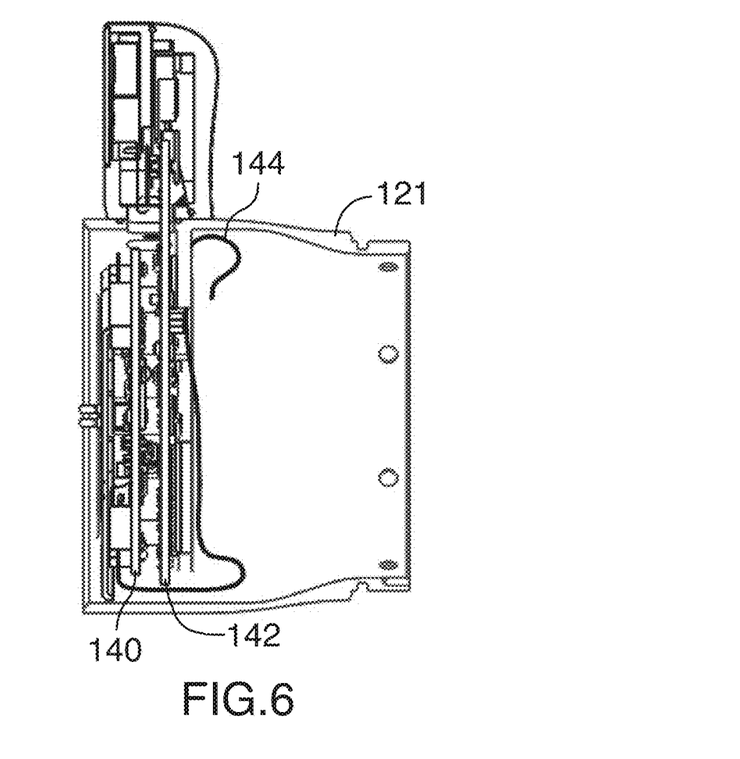
FIG. 6 is a cross-sectional side view of the vision guiding system of FIG. 3, in accordance with an embodiment.
Figure 7:
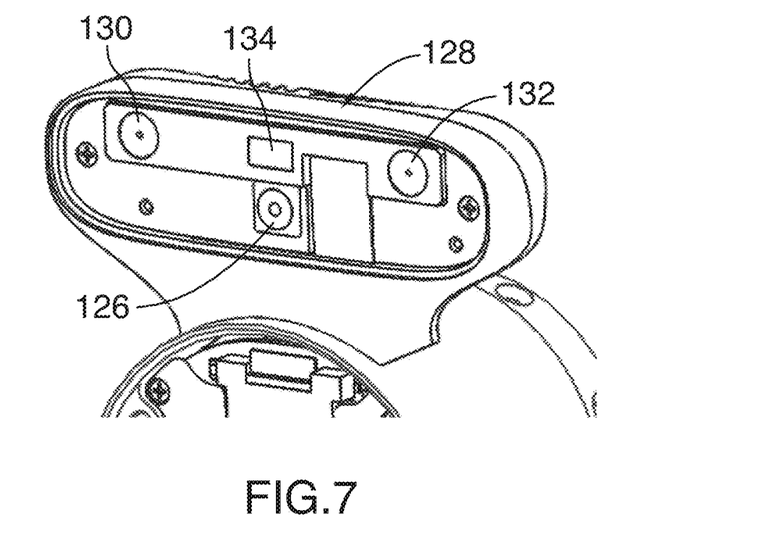
FIG. 7 is a detailed view of a sensor image device contained in the vision guiding system of FIG. 3, in accordance with an embodiment.

As illustrated in FIGS. 6 and 7, the top portion 122 comprises an image sensor device. In the illustrated embodiment, the image sensor device comprises a 2D image sensor 126 and a 3D image sensor 128 which includes two cameras 130 and 132 and an IR light source/projector 134. The cameras 130 and 132 are located on opposite sides of the IR light source 134 and the 2D image sensor is positioned below the IR light source 134.

The 2D and 3D image sensors 126 and 128 are positioned so as to face the gripper 104 when the vision guiding system 102 is secured to the gripper 104.

In one embodiment, the 2D image sensor 126 is oriented such that at least part of the fingers of the gripper 104 are always within the field of view of the 2D image sensor 126 when the vision guiding system 102 is secured to the gripper 104.

In the same or another embodiment, the 3D image sensor 128, i.e. the cameras 130 and 132 and the IR light source 134, is positioned such that the gripper 104 is never in the field of view of the 3D image sensor when the vision guiding system 102 is secured to the gripper 104.

It should be understood that any adequate 3D image sensor may be used. For example, the 3D image sensor 128 may use various technologies such as, but not limited to, stereovision, time-of-flight, laser beam, etc.

In one embodiment, the 2D image sensor 126 is a gray-level sensor. In another embodiment, the 2D image sensor 126 is a color sensor.

As illustrated in FIG. 6, electronic components are inserted into the tubular body 121 of the central portion. For example, the controller such as controller 18 may be inserted into the tubular body 121. In another example, the controller 18 may be inserted into the proximal arm segment 110. In a further embodiment, the controller 18 may be independent from and located outside of the robot arm 100. In the illustrated embodiment, electronic components such as an interconnect printed circuit board (PCB) 140 for interfacing with the gripper 104, a vision PCB 142 for managing the vision system, connecting cables 144 for electrically connecting the interconnect PCB 140 to another PCB located in the robot arm, and/or the like are contained within the tubular body 121.

Figure 8:
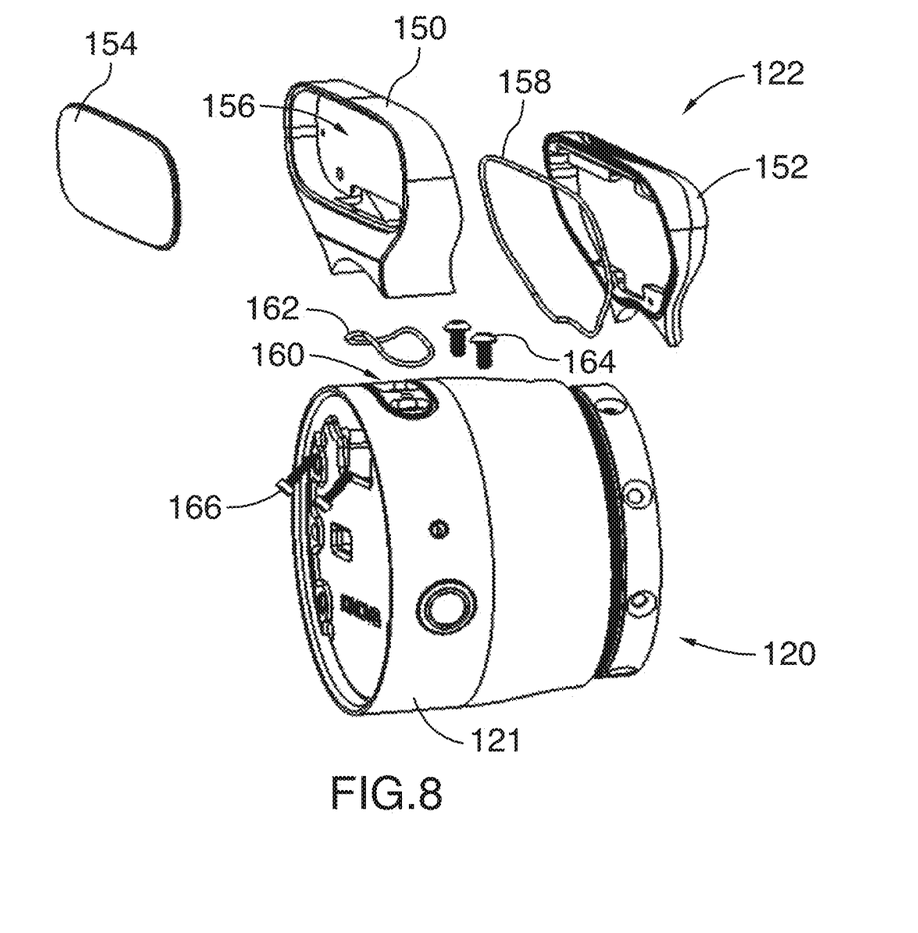
FIG. 8 is an exploded view of the vision guiding system of FIG. 3, in accordance with an embodiment.

FIGS. 7 and 8 illustrate an exploded view of the top portion 121 of the vision guiding system 102. The top portion comprises a first or central frame body 150, a second or back frame body 152 and a protective glass 154. The central frame body 150 comprises an aperture 156 extending therethrough for receiving the image sensor device therein. The back frame body 152 is securable to the back face of the central frame body 150. A seal 158 may be inserted between the central and back frame bodies 150 and 152. The protective glass 154 is secured to the front face of the central frame body 150 to close the aperture 156. A further seal (not shown) may be positioned between the protective glass 156 and the central frame body 150.

When the central frame body 150 and the back frame body 152 are secured together to form a frame assembly, an aperture is present through the bottom face of the frame assembly. When the top portion 122 is secured to the central portion 120, the aperture in the frame assembly is aligned with an aperture 160 that extends through the tubular body 121 so as to allow communication between the central and top portions 120 and 122. A seal 162 may be inserted between the central and top portions 120 and 122.

In one embodiment, seals such as seals 158 and 162 ensure that no contaminants may enter the top portion 122 and/or the central portion 120.

In one embodiment, frame mounting bolts 164 are used for securing the top portion 122 to the central portion 120. In the same or another embodiment, mounting bolts 166 are used for securing the back frame body 152 to the central frame body 150.

In an embodiment in which the vision guiding system is to be used in an assistive application, it may be advantageous that no fasteners are exposed to ensure proper sealing of the vision guiding system and to protect internal components from outside contaminants (glasses filled with water or juice, as examples) or various weather conditions (rain, snow).

In one embodiment, the tubular body 121 of the vision guiding system 102 may freely rotate about its longitudinal axis without any constraints, e.g. an infinite number of rotations can be achieved.

In one embodiment and as described above, the user may select a desired coordinate system for teleoperating the robot arm 100 The robot arm's base reference axes (or coordinate system) are identified with X0, Y0 and Z0 while the vision system reference axes (or coordinate system) are identified with X1, Y1 and Z1, as illustrated in FIG. 9. If the robot arm's reference axis is used with the "move forward" command, the robot arm gripper end will move in the direction of the X0 axis. Similarly, if the "move left" command is used, the robot arm gripper end will move in the direction of the Y0 axis. Those movements may be useful when the user can see the whole robot arm scene but could be counter intuitive when the user only sees the image sent by the vision guiding system. In this later case, using the vision system reference axis may help. Using the "move forward" command is this later case will have the robot arm gripper end moving in the direction of the X1 axis, while using the "move left" command will have the robot arm gripper end moving in the direction of the Y1 axis. As illustrated in FIG. 9, the axes X1, Y1 and Z1 are not aligned with the axes X0, Y0 and Z0, therefore leading to different robot movements depending on the reference axis used to teleoperate the robot arm.

The embodiments of the invention described above are intended to be exemplary only. The scope of the invention is therefore intended to be limited solely by the scope of the appended claims.

We claim:

1. A method for operating a vision guided robot arm system comprising a robot arm provided with an end effector at a distal end thereof, a display, an image sensor and a controller, the method comprising:
   receiving from the image sensor an initial image of an area comprising at least one object and displaying the initial image on the display;
   determining, by the controller, an object of interest amongst the at least one object and identifying the object of interest within the initial image;
   determining, by the controller, a potential action to be performed by a user, the potential action being related to the object of interest and providing the user with an identification of the potential action;
   receiving a confirmation of the object of interest and the potential action from the user;
   after said receiving the confirmation of the object of interest and the potential action, automatically moving the robot arm so as to position the end effector of the robot arm at a predefined position relative to the object of interest; and
   once the end effector is positioned at the predefined position, allowing the user to control the robot arm to perform the potential action.

2. The method of claim 1, wherein said determining an object of interest comprises determining at least two objects of interest and said identifying the object of interest within the initial image comprises identifying each one of the at least two objects of interest within the image.

3. The method of claim 2, wherein said determining a potential action comprises determining a respective potential action for each one of the at least two objects of interest.

4. The method of claim 3, wherein said receiving a confirmation of the object of interest and the potential action from the user comprises receiving an identification of a given one of the at least two objects of interest and a confirmation of the respective potential action associated with the given one of the at least two objects of interest.

5. The method of claim 1, wherein the predefined position is defined as a predefined distance from the object of interest.

6. The method of claim 1, wherein said determining the object of interest comprises:
   determining a surrounding of the user using the image;
   retrieving given objects associated with the determined surrounding of the user; and
   determining the object of interest amongst the given objects.

7. A system for operating a vision guided robot arm system comprising a robot arm provided with an end effector at a distal end thereof, a display, an image sensor and a controller, the system comprising:
   a processing unit;
   a communication unit;
   a memory having stored thereon statements and instructions that, when executed by the processing unit perform the following steps:

receiving from the image sensor an initial image of an area comprising at least one object and displaying the initial image on the display;

determining an object of interest amongst the at least one object and identifying the object of interest within the initial image;

determining a potential action to be performed by a user, the potential action being related to the object of interest and providing the user with an identification of the potential action;

receiving a confirmation of the object of interest and the potential action from the user;

after said receiving the confirmation of the object of interest and the potential action, automatically moving the robot arm so as to position the end effector of the robot arm at a predefined position relative to the object of interest; and once the end effector is positioned at the predefined position, allowing the user to control the robot arm to perform the potential action.

8. The system of claim 7, wherein said determining an object of interest comprises determining at least two objects of interest and said identifying the object of interest within the initial image comprises identifying each one of the at least two objects of interest within the image.

9. The system of claim 8, wherein said determining a potential action comprises determining a respective potential action for each one of the at least two objects of interest.

10. The system of claim 9, wherein said receiving a confirmation of the object of interest and the potential action from the user comprises receiving an identification of a given one of the at least two objects of interest and a confirmation of the respective potential action associated with the given one of the at least two objects of interest.

11. The system of claim 7, wherein the predefined position is defined as a predefined distance from the object of interest.

12. The system of claim 7, wherein said determining the object of interest comprises:
  determining a surrounding of the user using the image;
  retrieving given objects associated with the determined surrounding of the user; and
  determining the object of interest amongst the given objects.

13. A vision guiding system for a robot arm provided with an end effector at a distal end thereof, the system comprising:
  a frame securable to the robot arm;
  an image sensor device enclosed within the frame;
  a user interface comprising at least a display; and
  a controller for:
    receiving from the sensor image an initial image of an area comprising at least one object;
    determining an object of interest amongst the at least one object and identifying the object of interest within the initial image;
    determining a potential action to be performed by a user, the potential action being related to the object of interest and providing the user with an identification of the potential action;
    receiving a confirmation of the object of interest and the potential action from the user;
    after said receiving the confirmation of the object of interest and the potential action, automatically moving the robot arm so as to position the end effector of the robot arm at a predefined position relative to the object of interest; and
    once the end effector is positioned at the predefined position, allowing the user to control the robot arm to perform the potential action.

14. The vision guiding vision guiding system of claim 13, wherein the controller is configured for determining at least two objects of interest and said identifying the object of interest within the initial image comprises identifying each one of the at least two objects of interest within the image.

15. The vision guiding system of claim 14, wherein the controller is configured for determining a respective potential action for each one of the at least two objects of interest.

16. The vision guiding system of claim 15, wherein the controller is configured for receiving an identification of a given one of the at least two objects of interest and a confirmation of the respective potential action associated with the given one of the at least two objects of interest.

17. The vision guiding system of claim 13, wherein the predefined position is defined as a predefined distance from the object of interest.

18. The vision guiding system of claim 13, wherein the controller is configured for
  determining a surrounding of the user using the image;
  retrieving given objects associated with the determined surrounding of the user; and
  determining the object of interest amongst the given objects.

19. The vision guiding system of claim 13, wherein the image sensor device comprising a first image sensor having a first field of view and a second image sensor having a second field of view, the first image sensor being positioned and oriented so that at least part of the end effector of the robot arm be in the first field of view of the first image sensor and the second image sensor being positioned and oriented so that the end effector be outside of the second field of view of the second image sensor.

20. The vision guiding system of claim 19, wherein the first image sensor comprises a 2D image sensor.

21. The vision guiding system of claim 19, wherein the second image sensor comprises a 3D image sensor.

22. A vision guided robot arm system comprising:
  a robot arm provided with an end effector at a distal end thereof,
  an image sensor securable to the robot arm;
  a user interface comprising at least a display; and
  a controller for:
    receiving from the sensor image an initial image of an area comprising at least one object;
    determining an object of interest amongst the at least one object and identifying the object of interest within the initial image;
    determining a potential action to be performed by a user, the potential action being related to the object of interest and providing the user with an identification of the potential action;
    receiving a confirmation of the object of interest and the potential action from the user;
    after said receiving the confirmation of the object of interest and the potential action, automatically moving the robot arm so as to position the end effector of the robot arm at a predefined position relative to the object of interest; and
    once the end effector is positioned at the predefined position, allowing the user to control the robot arm to perform the potential action.

23. The vision guided robot arm system of claim 22, wherein the controller is configured for determining at least two objects of interest and said identifying the object of interest within the initial image comprises identifying each one of the at least two objects of interest within the image.

24. The vision guided robot arm system of claim 23, wherein the controller is configured for determining a respective potential action for each one of the at least two objects of interest.

25. The vision guided robot arm system of claim 24, wherein the controller is configured for receiving an identification of a given one of the at least two objects of interest and a confirmation of the respective potential action associated with the given one of the at least two objects of interest.

26. The vision guided robot arm system of claim 22, wherein the predefined position is defined as a predefined distance from the object of interest.

27. The vision guided robot arm system of claim 22, wherein the controller is configured for:

determining a surrounding of the user using the image;

retrieving given objects associated with the determined surrounding of the user; and determining the object of interest amongst the given objects.

28. The vision guided robot arm system of claim 22, wherein the image sensor device comprising a first image sensor having a first field of view and a second image sensor having a second field of view, the first image sensor being positioned and oriented so that at least part of the end effector of the robot arm be in the first field of view of the first image sensor and the second image sensor being positioned and oriented so that the end effector be outside of the second field of view of the second image sensor.

29. The vision guided robot arm system of claim 28, wherein the first image sensor comprises a 2D image sensor.

30. The vision guided robot arm system of claim 28, wherein the second image sensor comprises a 3D image sensor.

* * * * *